United States Patent
Wood et al.

(10) Patent No.: US 7,603,388 B2
(45) Date of Patent: Oct. 13, 2009

(54) REPRESENTING FILE DATA USING VIRTUAL HIERARCHY

(75) Inventors: Matthew D. Wood, Seattle, WA (US); Benjamen E. Ross, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 127 days.

(21) Appl. No.: 11/526,977

(22) Filed: Sep. 26, 2006

(65) Prior Publication Data

US 2008/0077623 A1  Mar. 27, 2008

(51) Int. Cl.
*G06F 17/30* (2006.01)
(52) U.S. Cl. .............. 707/200; 707/102; 707/100; 707/101
(58) Field of Classification Search .......... 707/100, 707/200–202, 1; 715/513; 713/200
See application file for complete search history.

(56) References Cited

U.S. PATENT DOCUMENTS

| | | | |
|---|---|---|---|
| 5,361,349 A | 11/1994 | Sugita et al. ............. 707/8 |
| 5,734,381 A | 3/1998 | Yoshizawa et al. ........ 715/841 |
| 5,752,252 A | 5/1998 | Zbikowski et al. ........ 707/205 |
| 5,870,734 A | 2/1999 | Kao ....................... 707/2 |
| 5,897,638 A | 4/1999 | Lasser et al. ............. 707/102 |
| 6,199,059 B1 | 3/2001 | Dahan et al. ............. 707/3 |
| 6,366,934 B1 * | 4/2002 | Cheng et al. ............. 715/210 |
| 6,954,746 B1 * | 10/2005 | Batista ................... 706/45 |
| 7,016,917 B2 | 3/2006 | Schreiber ................ 707/103 R |
| 7,024,583 B2 * | 4/2006 | Nguyen et al. ........... 714/5 |
| 2005/0149749 A1 * | 7/2005 | Van Brabant ............. 713/200 |
| 2005/0226059 A1 | 10/2005 | Kavuri et al. ............ 365/189.05 |
| 2006/0015848 A1 | 1/2006 | Schwarzmann ........... 717/116 |

FOREIGN PATENT DOCUMENTS

WO  WO02103573 A1  12/2002

OTHER PUBLICATIONS

Abidi, Syed Sibte Raza, "Information Brokering over the Information Highway: An Internet-Based Database Navigation System", Date: 1997, http://users.cs.dal.ca/~sraza/papers/INFOBROKER.pdf.

Cunningham, Bill W., "Linux Apprentice", Date: Jan. 1998, vol. 1998, Issue 45, Article No. 20, Specialized Systems Consultants, Inc., Seattle, WA, USA, http://delivery.acm.org/10.1145/330000/327193/a20-cunningham.html?key1=327193&key2=7537915511&coll=GUIDE&dl=GUIDE&CFID=1087470&CFTOKEN=67309937.

* cited by examiner

*Primary Examiner*—Yicun Wu
(74) *Attorney, Agent, or Firm*—Merchant & Gould

(57) ABSTRACT

Data in a file is read to virtual, autonomous, hierarchically structured object classes that are independent of an application implementation. The object classes are navigable and/or actionable allowing various operations including, but not limited to, validation, integrity testing, "file open", and file repair at the data level. By rendering a complete picture of the data including relationships before it is actually consumed by an application, security and robustness of applications can be enhanced.

18 Claims, 6 Drawing Sheets

REPRESENTING FILE DATA USING VIRTUAL HIERARCHY

BACKGROUND

Files containing unexpected data may cause instability in a client application during "file open" operations. Some applications include measures to address this potential problem including cancellable "file open", document recovery, or up-front validation. Other applications may include a per-datum validation system that checks individual pieces of data as they are loaded into memory, allowing the "file open" operation to end prematurely if any portion of the data is deemed invalid.

These approaches are, however, unable to overcome two significant problems. Firstly, at the time of discovery of an error, an unknown percentage of the file may already be loaded into memory. The application may be prone to crash as it tries to back away from a partially loaded file. Furthermore, abandoning the "file open" operation itself may present security concerns as the application cleans up incomplete data.

Moreover, the above described approaches typically validate only a single piece of data against known good values. Thus, they may lack the ability to consider data semantics. For example, a conventional system may be able to guarantee that value A falls in the range of 1 to 10, but may not be able to guarantee that value B is less than value A, or if value A is 4, value B must also be 4, etc. Validating these relationships between discreet pieces of data may enhance the ability of a data validation system to determine whether a file is well-formed.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to virtualizing data in a file by reading the data in the file to autonomous, hierarchically structured object classes that are independent of an application implementation. The object classes may be navigable and/or actionable allowing various operations including, but not limited to, validation, integrity testing, "file open", and file repair at the data unit level.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

As briefly described above, specific and variable file format data may be transformed into a virtual hierarchy of objects to enable validation, and similar operations to be performed at the data level avoiding risks of partial loading of files prior to opening. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located in both local and remote memory storage devices.

Embodiments may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

Figure 1:
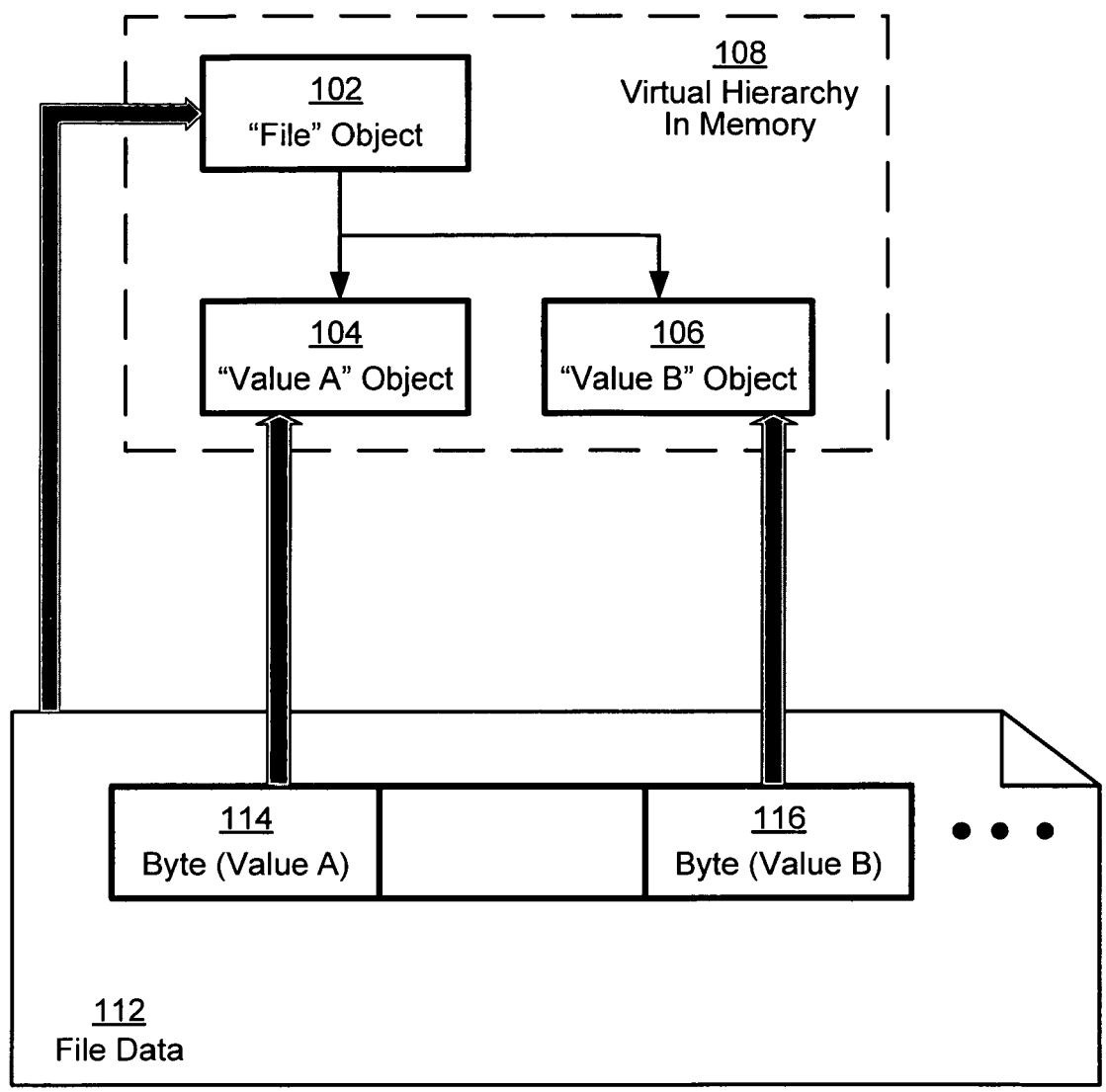
FIG. 1 illustrates an example virtualization of a file containing data in a "flat" structure.

Referring to FIG. 1, an example virtualization of a file containing data in a "flat" structure is illustrated. A system according to embodiments abstracts file loading code into a virtual hierarchy of navigable and actionable objects. File formats are varied and specific to each application, even to different versions of an application. Abstraction of file data removes that layer of complexity, creating a ubiquitous set of hierarchical elements that may be controlled by consumers for any number of applications.

When a target file is provided to the system, a first step is to create a root object to represent the entire file. Thus "File" object 102, which is created based on file data 112, includes references to all its child constructs and data.

For each construct or piece of data in the file, a new object is created in virtual hierarchy structure in memory 108. A simplified scenario is shown in FIG. 1, where (Value A) 114 and (Value B) 116 are bytes in file data 112. A new in-memory object 104 is created for "Value A", and this object is made a child of the "File" object 102. Similarly, another new in-memory object 106 is created for "Value B", and this object is also made a child of the "File" object 102.

Once the virtual hierarchy structure is complete, a number of operations may be performed with the virtualized in-memory data. For example, code may be added to the "Value A" object 104 to validate that its byte value is less than 4. Furthermore, "Value A" object 104 can navigate to "Value B" object 106 through the "File" object 102 and ensure "Value B" object's byte value is also less than 4. This ability to navigate may be used in a file validation system.

As described, file data 112 is read into autonomous object classes that are not tied to the application implementation itself. As a result, an application trying to open the file does not have to back anything out of memory once a file is deemed invalid, since the application never started the "file open" operation. Moreover, corrupt or missing portions of data may be fixed by providing appropriate code to the corresponding object(s).

Figure 2:
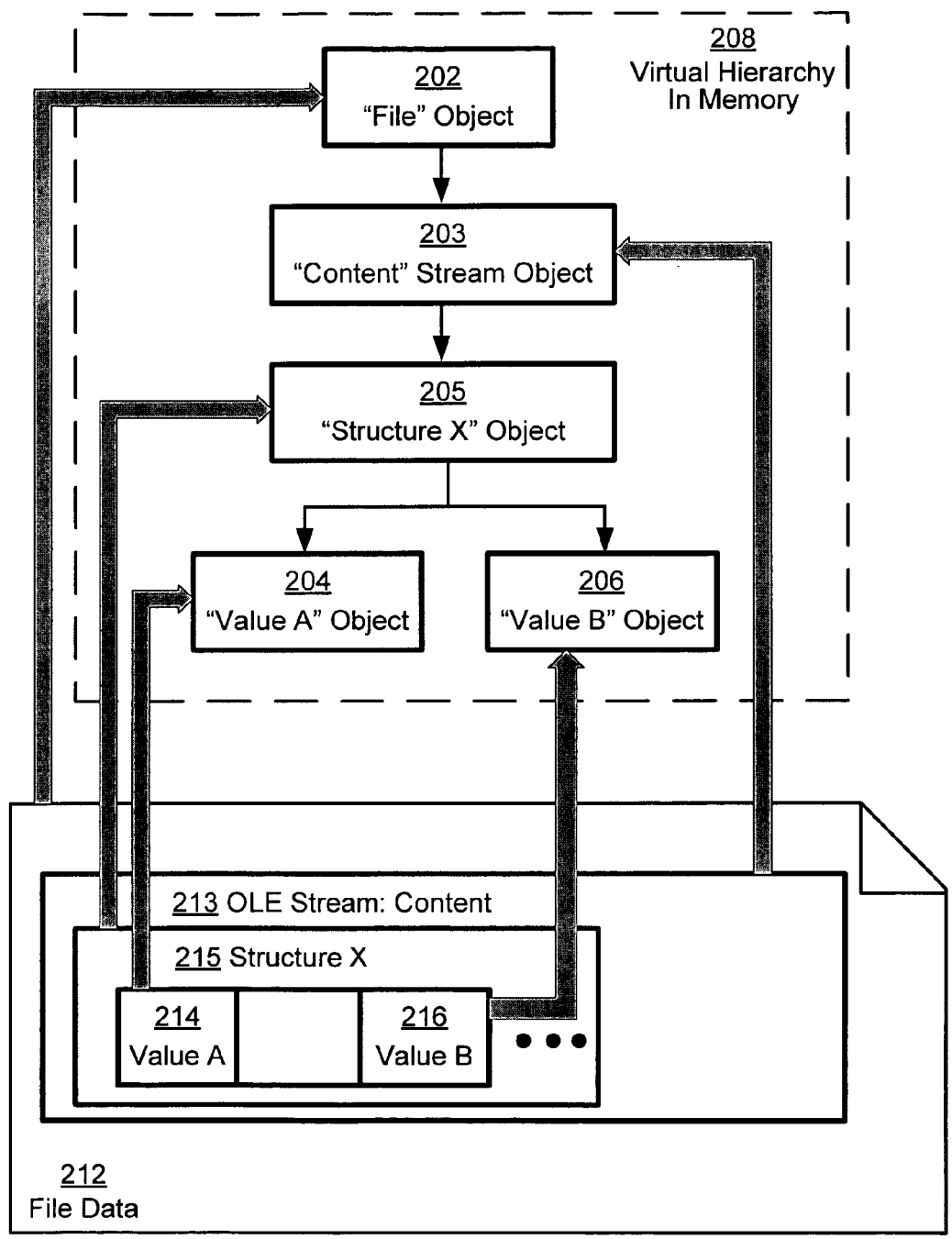
FIG. 2 illustrates another example virtualization of a file containing data in an Object Linking and Embedding (OLE) stream.

FIG. 2 illustrates another example virtualization of a file containing data in an Object Linking and Embedding (OLE) stream. In this second example, a virtual hierarchy is built to represent structured storage file data 212. In this case, the file has an OLE Stream 213 named "Content", which itself contains a structure 215 named "Structure X". Finally, "Structure X" 215 contains data Value A 214 and data Value B 216. Similar to the transformation in FIG. 1, "Value A" object 204 and "Value B" object 206 are generated in virtual memory 208 based on data Value A 214 and data Value B 216. The objects are children to "Structure X" object 205, which is based on structure 215 in the file. "Content" stream object 203 is a parent to "Structure X" object 205 as in the corresponding structures in the file. All of the described objects so far are children to "File" object 202 within the virtual hierarchy.

Typically, a significantly different code is needed to navigate and read a file that uses OLE structured storage rather than a flat file like the file in FIG. 1. However, by virtualizing the data into in-memory objects simpler code may be used in these objects to accomplish the same navigation and value retrieval as described in FIG. 1. As an example, code may be added to the "Content" stream object 203 to indicate to a consuming application that it has no "Structure X" (even if it really does). This would stress test the application's handling of unexpected situations, like the omission of a required piece of data.

Embodiments are not limited to the illustrated examples in FIG. 1 and FIG. 2. Other virtualizations such as different tree structures (e.g. vertical tree, horizontal tree, diagonal tree), different types of data, files, and objects may be implemented using the principles described herein.

Figure 3:
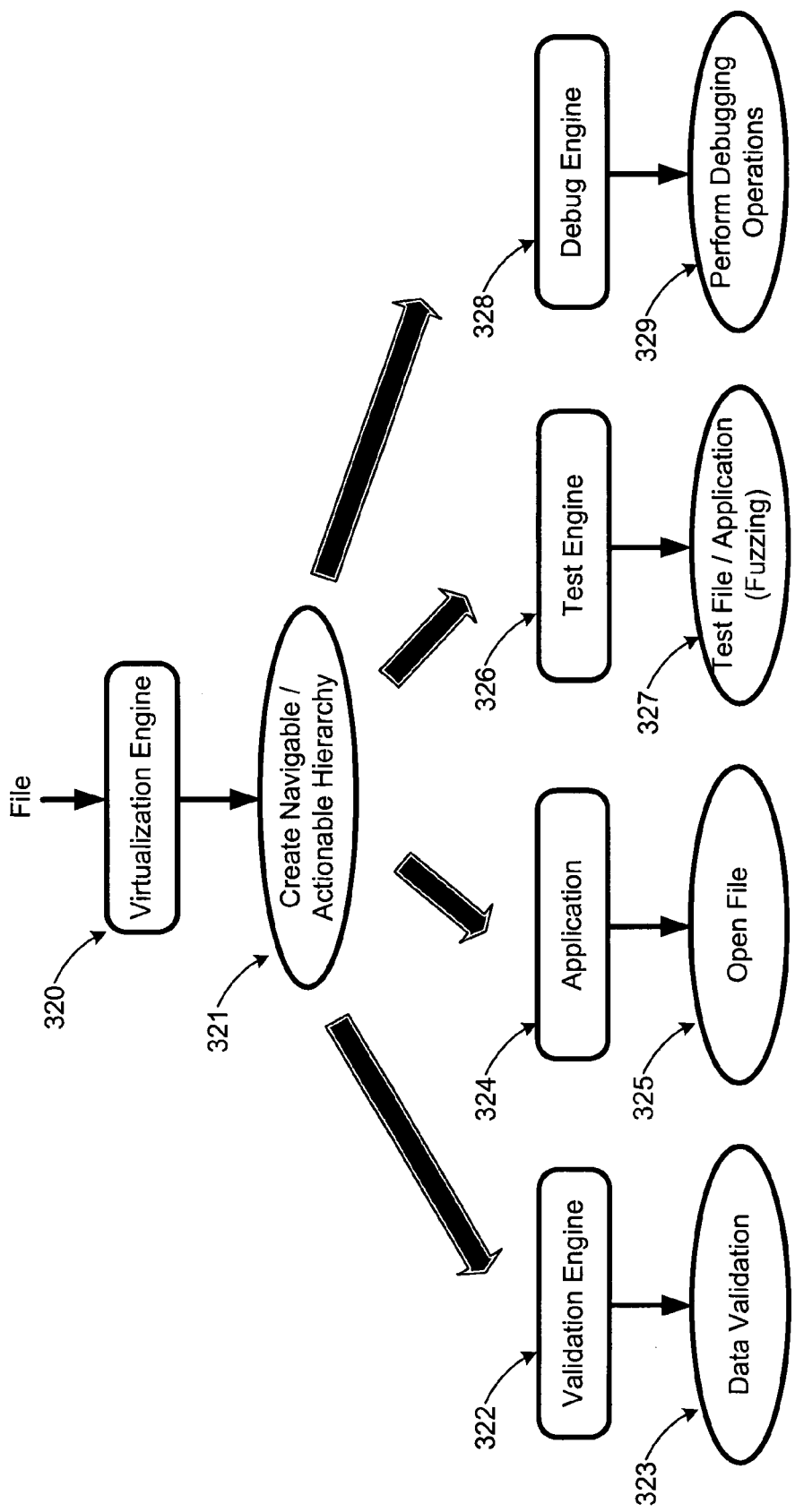
FIG. 3 is a conceptual diagram illustrating main components and the associated processes in a virtualization based file processing system according to embodiments.

FIG. 3 is a conceptual diagram illustrating main components and the associated processes in a virtualization based file processing system according to embodiments.

As mentioned previously, each of the elements that make up the virtual hierarchy may have the ability to navigate through the hierarchy to other elements. One element (object) that represents a data piece from the file may navigate to another element that represents another piece of data and check for applicable conditions. This ability allows performance of various operations on the virtual hierarchy, which may not be as easy to perform on the original file, if at all possible.

Four example operations are represented in FIG. 3. First, virtualization engine 320 creates virtual hierarchy with navigable and actionable elements in operation 321. Virtualization engine 320 may create and store the virtual hierarchy in the form of an eXtensible Mark-up Language (XML) file, or any other structured data format. Virtualization engine 320 may determine the hierarchic structure (relationships between the objects) based on a format of the input data and/or placement of data within the file. Once the virtual hierarchy is created, validation engine 322 may perform data validation operations 323 on the data using the elements of the virtual hierarchy. Validation may take any form. Code may be added by the validation engine to individual objects such that they can navigate through the hierarchical structure and verify conditions for validation. For example, one child object may be coded such that it can check the value of at least one more child object in comparison to its own value ("Is A greater than B?").

Because the validation engine 322 checks and validates the data of the file using the virtual hierarchy before the file is actually consumed by the application, the validation process adds a significant layer of security. If the file were to contain corrupt or otherwise harmful data, that data can be detected quickly without getting a chance to cause unintended operation in the underlying application.

Another example is the underlying application (324) itself. If a portion of data is missing or corrupt in the data file, application 324 may not be able to cancel an already started "file open" process 325 and crash. Since working with multiple applications and documents simultaneously is very common, such a crash caused by faulty data in one file may result in more harm than crashing just one application. Using the virtual hierarchy to check the data, however, application 324 can verify that the file contains complete and safe data before loading a single byte from the file. Once the virtual hierarchy of objects based on the file data is verified, the actual "file open" process 325 may begin safely.

A further example of using the virtual hierarchy is testing of files or applications for integrity and/or robustness. One such type of test category is called fuzzing. Fuzzing is the process of providing an application with a lot of different and mostly broken input. The input is in many cases good enough, so that application assumes valid input. At the same time the input is broken enough, so that parsing done on this input will fail. Such failing can lead to unexpected results such as crashes, information leaks, delays, and the like. Typical fuzzing techniques used to test an application's robustness are not narrowly focused. Therefore, unexpected crashes and failures may occur forcing developers to investigate each failure. Using the virtual hierarchy, more targeted fuzzing test tools may be developed to be executed by test engine 326 in test operation 327, since a complete picture of what is supposed to be valid in the data file including relationships to other data resides in the virtual hierarchy. For example, added code in the hierarchy objects can stress test all values that are considered valid.

The fourth example is debug engine 328 performing debugging operations 329 using the virtual hierarchy of objects. Since each discreet piece of data in a file is represented by a class object, that class can manipulate the data at run-time. This may, in turn, enable more efficient detect and repair functionality, and enhanced debugging file viewers or editors, because each piece of data can be manipulated at run-time and their relationships are known through the hierarchy structure.

Embodiments are not limited to the example engines and operations discussed above. Many other types of operations may be performed in a virtualization system according to embodiments using the principles described herein.

Figure 4:
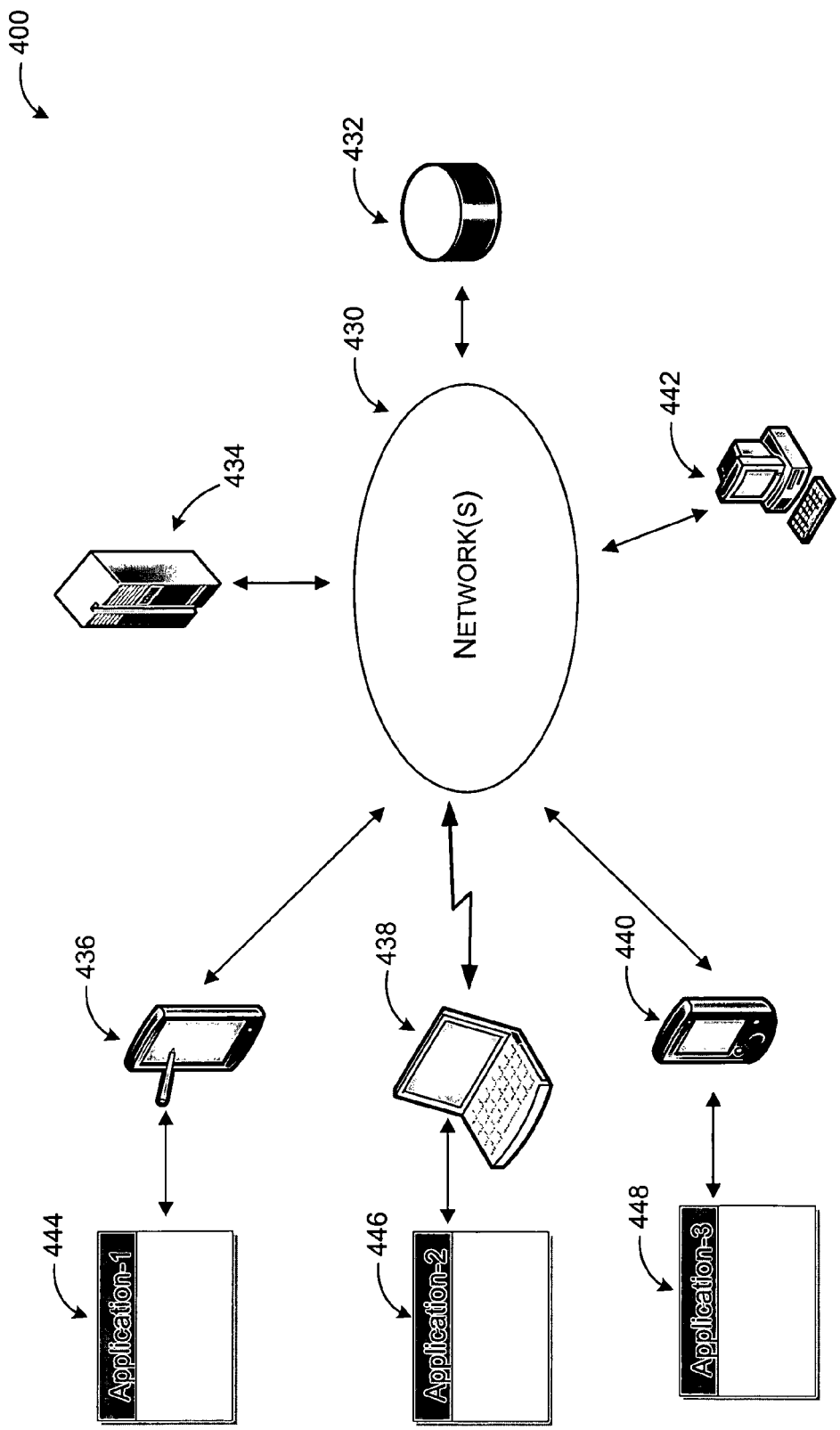
FIG. 4 illustrates use of file data virtualization in a networked system.
Figure 5:
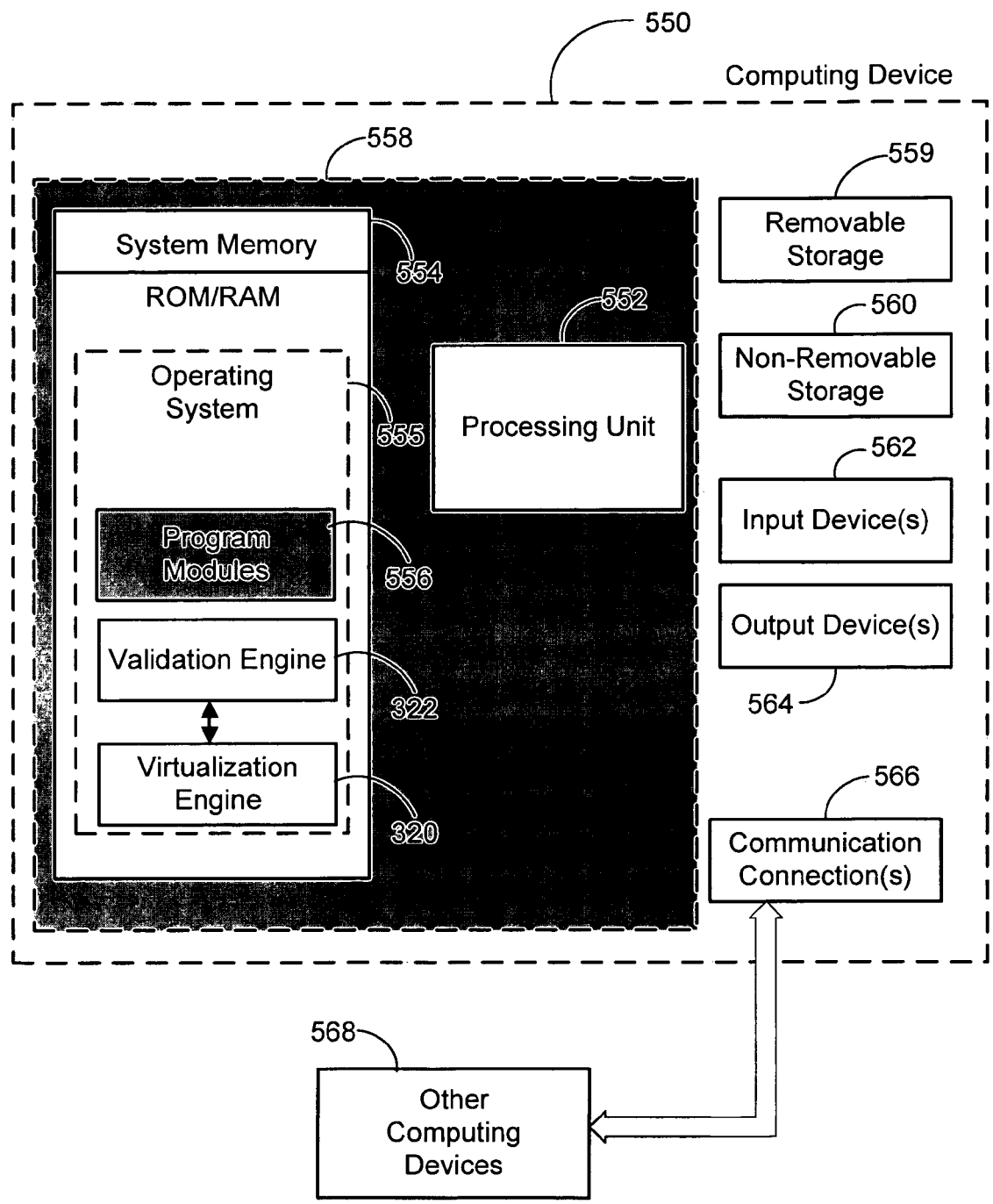
FIG. 5 is a block diagram of an example computing operating environment, where embodiments may be implemented.

Referring now to the following figures, aspects and exemplary operating environments will be described. FIG. 4, FIG. 5, and the associated discussion are intended to provide a brief, general description of a suitable computing environment in which embodiments may be implemented.

FIG. 4 illustrates use of file data virtualization in a networked system. System 400 may comprise any topology of servers, clients, Internet service providers, and communication media. Also, system 400 may have a static or dynamic topology. The term "client" may refer to a client application or a client device employed by a user to perform operations associated with accessing a networked system. While a networked file data virtualization system may include many more components, relevant ones are discussed in conjunction with this figure.

Applications (e.g. 444, 446, and 448) with file data virtualization may be executed on individual computing devices such as computing devices 436, 438, 440, and 442. On the other hand, a networked service may be provided to various applications on client devices where a server centrally manages virtualization and subsequent operations. For example, server 434 may include programs that communicate with individual applications on client devices, such as application 1 (444) on computing device 436, application 2 (446) on computing device 438, and the like, over network(s) 430. When the application is about to consume a file, a validation engine on server 434 may first create a virtual hierarchic tree of objects based on discrete data pieces of the file. Each object in the virtual hierarchy may be navigable and actionable. The navigability is especially significant, because it enables human readability, i.e. a developer can easily determine from the code action sequences generated for the data such as validation. Furthermore, the granularity of the hierarchical tree coupled with the human readable navigability allows a program developer to determine action sequences at byte level. This in turn may enable enhanced operations such as debugging, file repair, file test, and the like.

In executing the centrally managed virtualization system, server 434 may also communicate with database 432 over network(s) 430 for retrieving or storing data. Database 432 may include one or more data stores, such as SQL servers, databases, non multi-dimensional data sources, file compilations, data cubes, and the like. Server 434 may include additional programs with various functionalities that can utilize the virtual hierarchy of objects. Such programs may include validation programs, file testing programs, file repair programs, debugging programs, security applications, and the like. Some or all of these programs may also reside in the individual computing devices and be executed locally. As described above, the applications (444, 446, and 448) may also include integrated functionality for utilizing the virtual hierarchy such as a "file open" function or any of the above described operations. Once the pre-consumption operations are completed, the original application may consume the data from the file.

Network(s) 430 may include a secure network such as an enterprise network, an unsecure network such as a wireless open network, or the Internet. Network(s) 430 provide communication between the nodes described herein. By way of example, and not limitation, network(s) 430 may include wired media such as a wired network or direct-wired connection, and wireless media such as acoustic, RF, infrared and other wireless media.

Many other configurations of computing devices, applications, data sources, data distribution and analysis systems may be employed to implement a file data virtualization system. Furthermore, the networked environments discussed in FIG. 4 are for illustration purposes only. Embodiments are not limited to the example applications, modules, or processes. A networked environment for implementing representing file data using a virtual hierarchy may be provided in many other ways using the principles described herein.

With reference to FIG. 5, a block diagram of an example computing operating environment is illustrated, such as computing device 550. In a basic configuration, the computing device 550 typically includes at least one processing unit 552 and system memory 554. Computing device 550 may include a plurality of processing units that cooperate in executing programs. Depending on the exact configuration and type of computing device, the system memory 554 may be volatile (such as RAM), non-volatile (such as ROM, flash memory, etc.) or some combination of the two. System memory 554 typically includes an operating system 555 suitable for controlling the operation of a networked personal computer, such as the WINDOWS® operating systems from MICROSOFT CORPORATION of Redmond, Wash. The system memory 554 may also include one or more software applications such as program modules 556, virtualization engine 320, and validation engine 322.

Virtualization engine 320 may work in a coordinated manner as part of a system that includes additional engines for performing operation on the virtual hierarchy of objects created based on discrete pieces of data in a file. Validation engine 322 is an example member of additional engines that utilize the virtualization engine's output. As described previously in more detail, virtualization engine 320 provides the ability to represent highly specific and varied file format data in a virtual hierarchy of code objects. Virtualization engine 320, validation engine 322, and any other related engines may be an integrated part of an application or operate remotely and communicate with the application and with other applications running on computing device 550 or on other devices. Furthermore, virtualization engine 320 and validation engine 322 may be executed in an operating system other than operating system 555. This basic configuration is illustrated in FIG. 5 by those components within dashed line 558.

The computing device 550 may have additional features or functionality. For example, the computing device 550 may also include additional data storage devices (removable and/or non-removable) such as, for example, magnetic disks, optical disks, or tape. Such additional storage is illustrated in FIG. 5 by removable storage 559 and non-removable storage 560. Computer storage media may include volatile and non-volatile, removable and non-removable media implemented in any method or technology for storage of information, such as computer readable instructions, data structures, program modules, or other data. System memory 554, removable storage 559 and non-removable storage 560 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 550. Any such computer storage media may be part of device 550. Computing device 550 may also have input device(s) 562 such as keyboard, mouse, pen, voice input device, touch input device, etc. Output device(s) 564 such as a display, speakers, printer, etc. may also be included. These devices are well known in the art and need not be discussed at length here.

The computing device 550 may also contain communication connections 566 that allow the device to communicate with other computing devices 568, such as over a network in a distributed computing environment, for example, an intranet or the Internet. Communication connection 566 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

The claimed subject matter also includes methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 6:
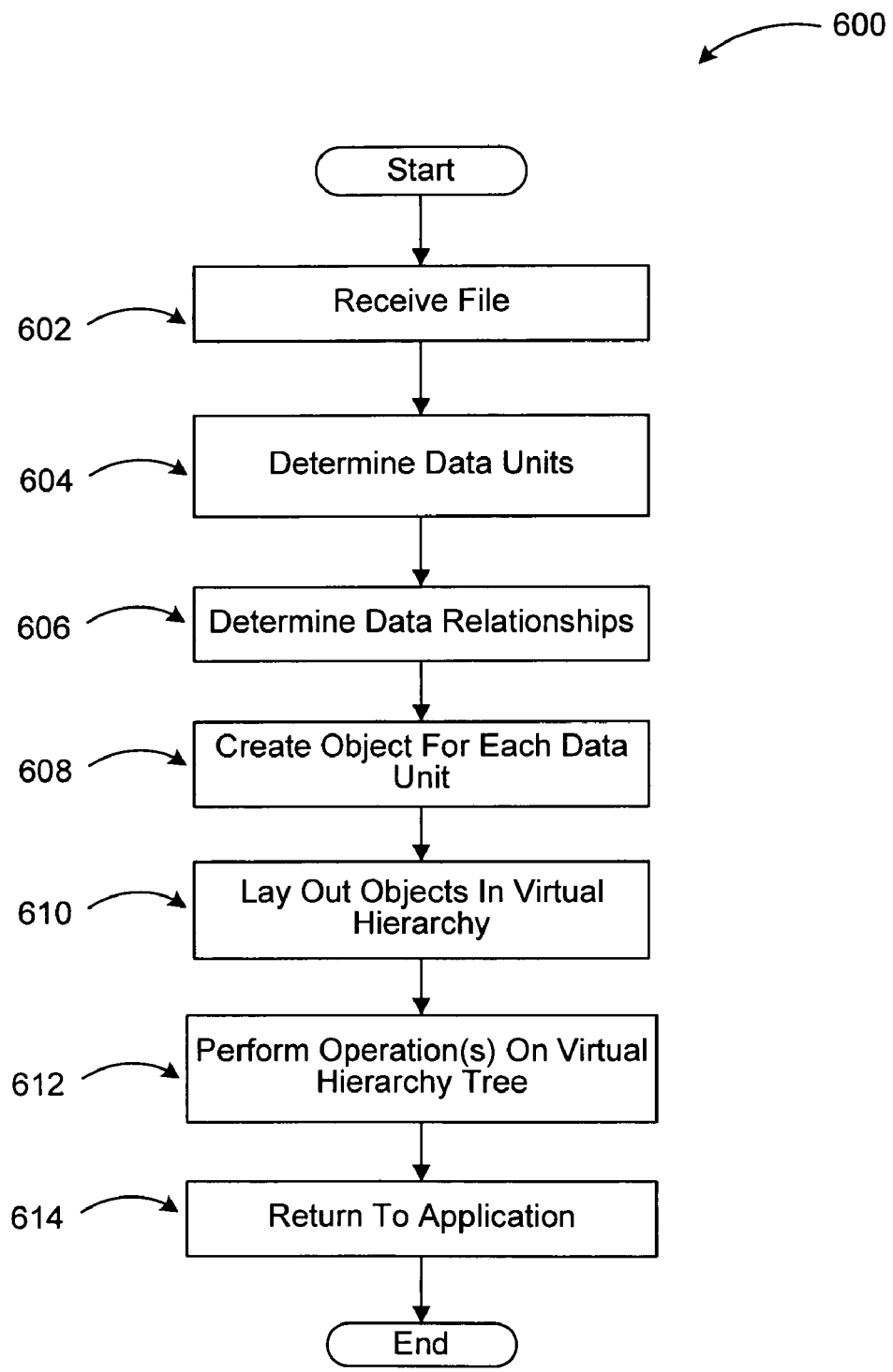
FIG. 6 illustrates a logic flow diagram for a process of using file data virtualization.

FIG. 6 illustrates a logic flow diagram for a process of using file data virtualization. Process 600 may be implemented in an application that includes a virtualization engine.

Process 600 begins with operation 602, where a virtualization engine receives a file that includes data to be consumed by the application. The data in the file may be in any format such as a "flat" structure, an OLE stream, and the like. Processing advances from operation 602 to operation 604.

At operation 604, data units within the file are determined. Depending on a format of the file, the data may be in bytes, structures, or other units. Processing proceeds from operation 604 to operation 606.

At operation 606, the relationships between the data units are determined based on a format of the data, a placement of the data within the file, and the like. Processing moves from operation 606 to operation 608.

At operation 608, the virtualization engine creates virtual objects corresponding to each data unit within the file. In one embodiment, the virtual objects may be class objects in XML format, where the class is determined based on the data type or a functionality of the object. Processing advances from operation 608 to operation 610.

At operation 610, the virtualization engine creates the virtual hierarchy comprising the objects created in operation 608. A placement of the objects within the hierarchy may be determined based on the relationships between the corresponding data units, and all objects corresponding to the data units may be under a root object corresponding to the file that contains the data. Processing advances from operation 610 to operation 612.

At operation 612, pre-consumption operations such as validation, file test, debug, file repair, and the like may be performed using the virtual hierarchy by one or more engine. These operations can be performed with enhanced accuracy, flexibility, and security because a complete picture of the data layout in the file is reflected by the virtual hierarchy and the data is not actually loaded into the application to perform the operations. Processing advances from operation 612 to operation 614.

At operation 614, the data is returned to the application after any pre-consumption tasks are completed. After operation 614, processing moves to a calling process for further actions.

The operations included in process 600 are for illustration purposes. Providing file data virtualization may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for processing data in a file prior to consumption by an application, the method comprising:
   receiving a request to open the file by the application, wherein the file comprises a plurality of data;
   determining discrete data units and relationships between the data units in the file about to be consumed by the application;
   creating a virtual object for each data unit and creating a class for each virtual object, wherein the class of each virtual object is based on one of a data type of each virtual object and a functionality of each virtual object;
   creating a virtual hierarchic structure of the virtual objects based on the determined relationships; and
   providing the virtual hierarchic structure for a pre-consumption operation, wherein the pre-consumption operation comprises verifying, prior to the consumption of the file by the application, that the plurality of data in the file is complete and is not operative cause, upon the consumption of the file by the application, an unintended operation of the application by inserting code into at least one virtual object of the virtual objects, wherein inserting the code into the at least one virtual object of the virtual objects comprises inserting the code that is operative to cause, upon execution by a computing device, subsequent code execution of at least one next virtual object in the virtual hierarchic structure.

2. The method of claim 1, wherein the virtual objects are autonomous and independent from the application.

3. The method of claim 1, wherein the virtual objects are navigable and actionable.

4. The method of claim 3, wherein inserting the code to at least one virtual object of the virtual objects further comprises inserting the code operative to verify validation conditions for the at least one virtual object.

5. The method of claim 1, wherein the pre-consumption operation is performed by a module that is one of: integrated into and separate from the application.

6. The method of claim 1, further comprising:
   upon determining at least one virtual object of the virtual objects corresponding to a corrupt portion of data, inserting code to the at least one virtual object for one of: quarantining the corrupt portion of data and repairing the corrupt portion of data.

7. The method of claim 1, wherein the virtual hierarchic structure includes one of: a vertical tree structure, a horizontal tree structure, and a diagonal tree structure.

8. The method of claim 1, wherein the virtual hierarchic structure is created in an eXtensible Mark-up Language (XML) format.

9. The method of claim 8, wherein the virtual objects are XML nodes, and a file object corresponding to the file is a root node.

10. The method of claim 1, further comprising:
determining a relationship between the virtual objects based on at least one of: a format of the data in the file and a placement of the data in the file.

11. The method of claim 1, wherein the virtual objects are configured to manipulate corresponding object data at run-time.

12. A computer-readable storage medium having a set of instructions which when executed by a computing device performs a method for representing file data employing a virtual hierarchy, the method executed by the set of instructions comprising:
receiving a request to open a file by an application;
determining relationships between discrete pieces of data in the file based on at least one of: a format of each discrete piece of data in the file and a placement of each discrete piece of data in the file;
creating the virtual hierarchy comprising navigable class objects, wherein each navigable class object corresponds to a discrete piece of data of the discrete pieces of data in the file, and wherein each navigable class object is placed within the virtual hierarchy based on the determined relationships;
storing the virtual hierarchy as a structured data file comprising eXtensible Mark-up Language (XML);
manipulating the navigable class objects at run-time to test the application with a range of input data, wherein manipulating the navigable class objects at run-time to test the application with the range of input data comprises structuring the range of input data in order for the application to assume that the range of input data is valid while preventing the application from being able to parse the range of input data; and
validating the file prior to consumption by an application by performing a validation operation on the virtual hierarchy, wherein validating the file comprises:
verifying the discrete pieces of data in the file to be complete and not operative to cause, upon execution by the application, an unintended operation of the application prior to allowing the application to open the file and load the discrete pieces of data from the file,
inserting a first code into at least one class object of the navigable class objects to navigate through the navigable class objects in the virtual hierarchic structure, wherein inserting the first code into the at least one class object of the navigable class objects comprises inserting the first code operative to cause subsequent code execution of at least one next class object in the virtual hierarchic structure, and
inserting a second code to the at least one class object of the navigable class objects to verify the discrete piece of data associated with the at least one class object is not corrupt, wherein inserting the second code into the at least one class object of the navigable class objects comprises inserting the second code for one of: quarantining a corrupt portion of the associated discrete piece of data and repairing the corrupt portion of the associated discrete piece of data.

13. The method of claim 1, further comprising manipulating the virtual objects at run-time to test the application with a range of input data, wherein manipulating the virtual objects at run-time to test the application with the range of input data comprises structuring the range of input data in order for the application to assume that the range of input data is valid while preventing the application for being able to parse the range of input data.

14. The computer-readable storage medium of claim 12, wherein the navigable class objects are independent from the application, and wherein the navigable class objects are arranged to manipulate the corresponding discrete piece of data at run-time.

15. A system for representing file data employing a virtual hierarchy, the system comprising:
a memory storage; and
a processing unit coupled to the memory storage, wherein the processing unit is operative to provide:
a virtualization engine configured to:
receive a file in response to a request by an application to open the file;
determine discrete pieces of data within the file;
determine relationships between the pieces of data;
create a virtual object corresponding to each piece of data; and
create the virtual hierarchy structure by placing the virtual objects in the structure based on the inter-relationships of their corresponding pieces of data; and
a pre-consumption operation engine configured to:
perform a pre-consumption operation on the file using the virtual hierarchic structure by verifying the discrete pieces of data within the file are complete and not harmful to the system prior to allowing the application to open the file and load the discrete pieces of data from the file, and
insert code into at least one virtual object of the virtual objects for navigating to at least one next virtual object in the virtual hierarchic structure while verifying validation conditions for the at least one virtual object.

16. The system of claim 15, wherein the pre-consumption operation engine is one of: a file repair, a debugging engine, and a stress test engine, respectively configured to stress test the application consuming the data, to debug the application, and to repair the file data in the file based on operations performed on the virtual objects in the virtual hierarchic structure.

17. The system of claim 16, wherein the pre-consumption engine is further configured to manipulate the virtual objects at run-time to test the application with a range of input data which is operable to be executed by the pre-consumption engine but is not operable to be parsed by the pre-consumption engine.

18. The system of claim 15, wherein the application is configured to open the file upon confirmation of file data integrity using the virtual hierarchic structure.

* * * * *